Nov. 30, 1926.

H. KREISINGER ET AL 1,608,699

FUEL DRYING APPARATUS

Filed August 23, 1923    4 Sheets-Sheet 1

WITNESS
Gustav Genzlinger.

INVENTORS
Henry Kreisinger
John E. Bell
John Anderson
BY
ATTORNEYS

Nov. 30, 1926.                                                         1,608,699
H. KREISINGER ET AL
FUEL DRYING APPARATUS
Filed August 28, 1923        4 Sheets-Sheet 3

WITNESS
Gustav Genzlinger.

INVENTORS
Henry Kreisinger
John E. Bell
John Anderson
By Armentrout & Fechner
ATTORNEYS Patented Nov. 30, 1926.

1,608,699

UNITED STATES PATENT OFFICE.

HENRY KREISINGER, OF PIERMONT, JOHN E. BELL, OF BROOKLYN, NEW YORK, AND JOHN ANDERSON, OF MILWAUKEE, WISCONSIN, ASSIGNORS TO COMBUSTION ENGINEERING CORPORATION, OF NEW YORK, N. Y., A CORPORATION OF NEW YORK.

FUEL-DRYING APPARATUS.

Application filed August 28, 1923. Serial No. 659,745.

Our invention relates to fuel drying apparatus, and particularly to apparatus for the drying of fuel for pulverized fuel furnaces. We aim to dry the fuel economically and conveniently; to minimize moisture in the supply and pulverizing systems of such furnaces; and to improve the operation of such systems. How these and other advantages can be realized through our invention will appear from our description hereinafter of the best mode and apparatus known to us for carrying out the invention in practice.

In the drawings, Fig. 1 is a somewhat diagrammatic side view (partly in vertical section) of a pulverized fuel furnace with fuel supply system embodying our invention.

Fig. 5 is a side view of a modified form of drier, from the opposite side as compared with Fig. 2.

Figure 2:
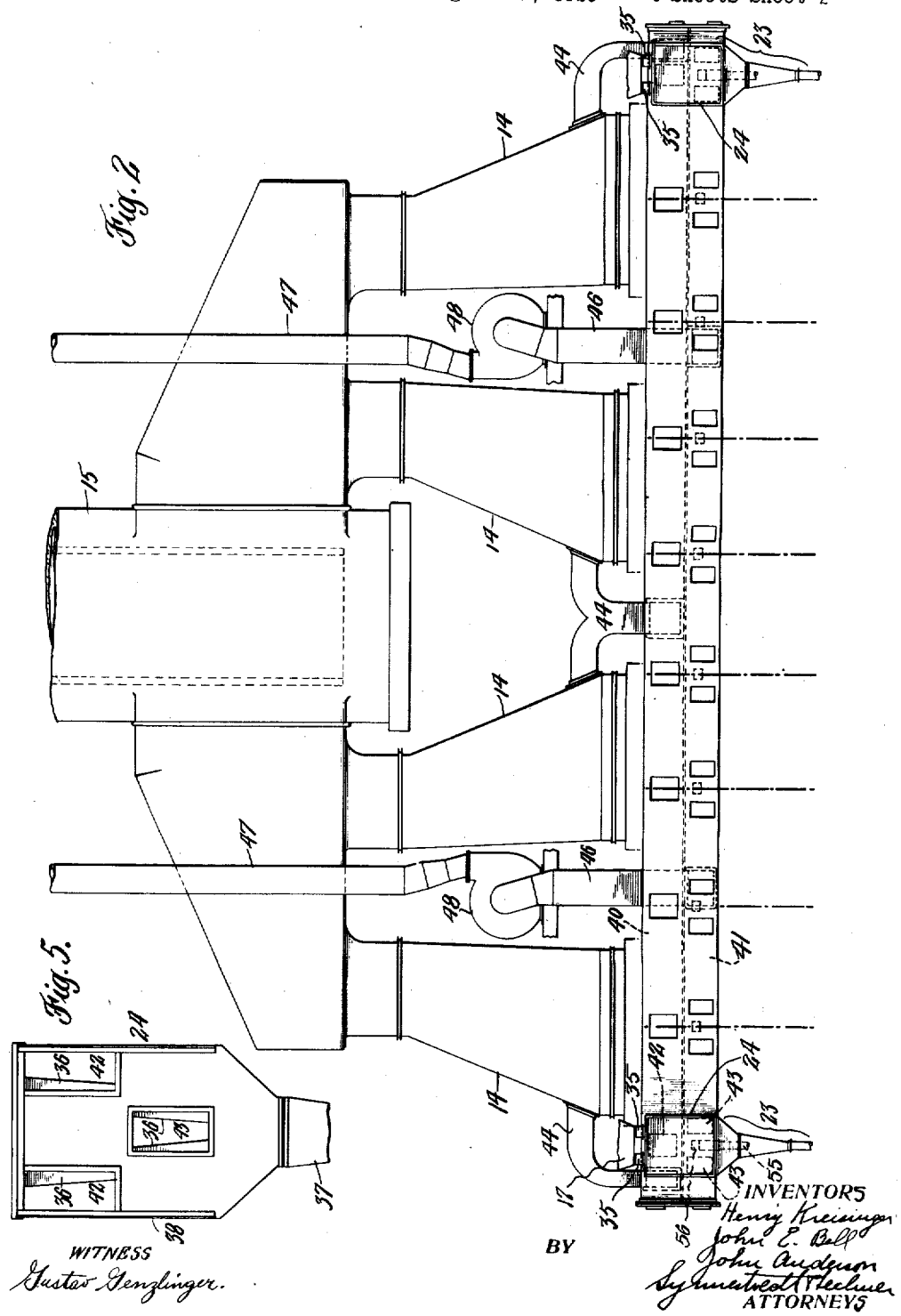
Fig. 2 is a similarly diagrammatic view at right angles to Fig. 1, taken as indicated by the line 2—2 in Fig. 1, illustrating especially the furnace uptakes and the connections therefrom for supplying gases to dry the fuel.

In the furnace installation here diagrammatically illustrated, powdered fuel with somewhat more than carrying air is admitted to the combustion chamber 10 through a downward directed burner 11 adjacent the front wall 12. The burning air and fuel stream descends in the chamber 10 until its momentum is overcome by the draft, when it bends upward and ascends in the rear of the chamber. The size and depth of the chamber 10 afford space for substantially complete combustion; and a cooling zone is maintained in its lower region, to prevent hard aggregations of fused slag on its bottom, in accordance with the usual practice. The products of combustion finally make their exit from the upper rear region of the chamber 10 into the boiler indicated at 13. From the boiler 13, the waste gases are discharged through an uptake 14, which itself ultimately discharges into a stack 15. As shown in Fig. 2, the installation comprises a battery of four furnaces in a row, with their uptakes 14 all connected to the one common stack 15.

The fuel supply system here shown comprises suitably elevated bins 17 and 18, one for receiving and storing crushed fuel (such as bituminous coal), and the other for storing the fuel when powdered,—as well as a pulverizing system and various accessories. From the bin 18, the burner 11 is supplied with fuel by means of an aerating feeder 20 such as commonly used in systems. From the bin 17, the crushed coal is fed down by gravity to the intake 21 of a motor-driven aerating fuel pulverizer 22, through a chute 23 that includes a drier 24, and also a valve 25. From the pulverizer 22, the fuel-laden air passes up through a conduit 26 to a funnel-shaped "cyclone" separator 27, which it enters tangentially near the top. The powdered fuel falls to the bottom of the separator 27, and is discharged into a subjacent closed-topped hopper 28,—whence it may be elevated and delivered to the closed-topped bin 18, at 29, by any means desired, here diagrammatically represented at 30. The air that has been unloaded of its fuel in the separator 27 makes its exit through a conduit 31 (that extends down into the separator as shown) and is returned to the air intake 32 of the pulverizer 22,—to be again charged with fuel, etc., as just described. This continual substantially closed circulation of the carrying air may be maintained by a motor-driven centrifugal exhauster fan 33 interposed at a suitable point in the conduit 31, to draw the unloaded air from the separator 27 and through the pulverizer 22, etc.

It will be seen, therefore, that the fuel is dried at 24 in the crushed state, on its way to the pulverizer 22. As a result, the fuel enters the pulverizer 22 much drier than usual, so that not only can its particles be more readily picked up by the air as it is pulverized, but the air circulated in the pulverizing system absorbs moisture much less rapidly. As a result, there need be no difficulty about keeping this air desirably dry, by continually discharging from the circulatory system the excess of air representing the influx by leakage on the low pressure side of the exhauster 33. Furthermore, only the very minimum amount of air unavoidably leaking in need be discharged for this purpose. And even the small amount of powdered coal left in the air so discharged by the separator 27 can readily be saved, as hereinafter explained.

Figure 1:
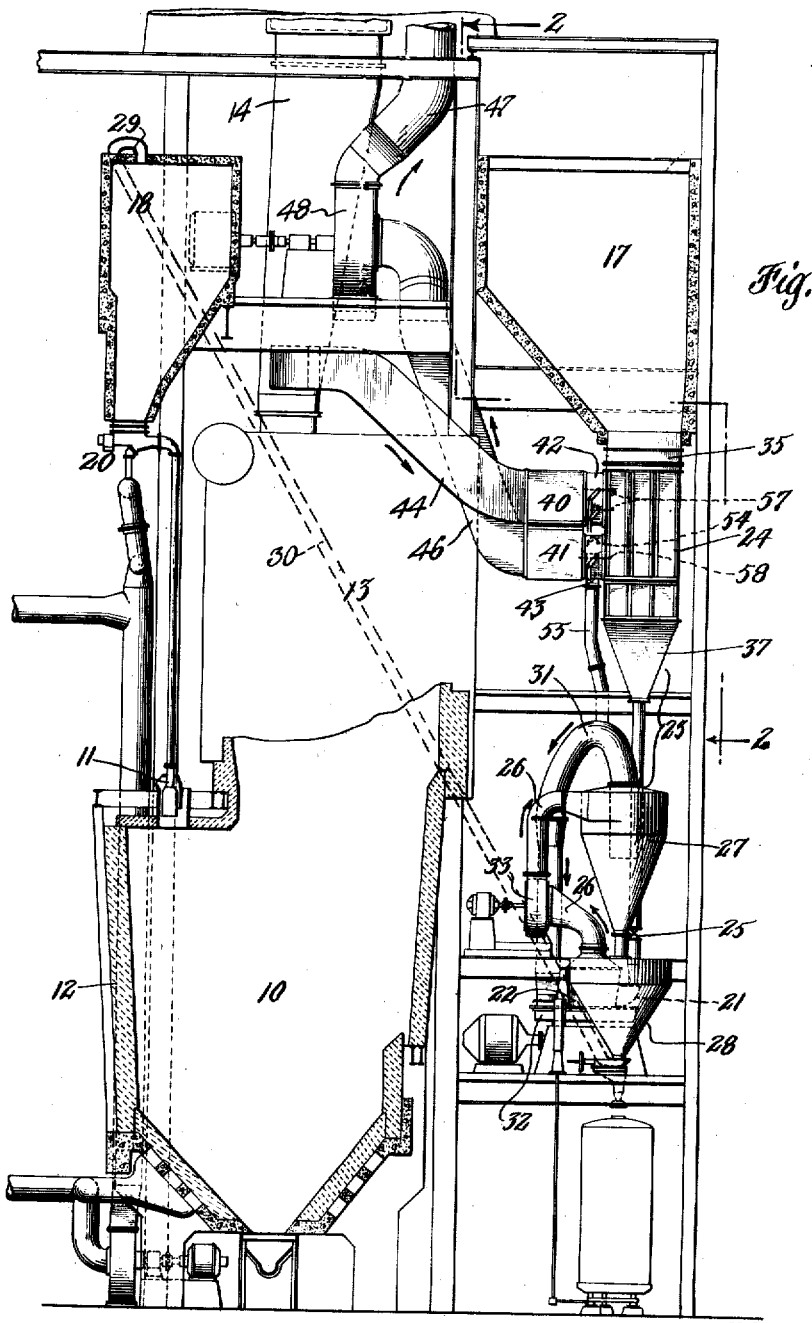

As shown in Figs. 1 to 4, the drier 24 is located directly beneath the bin 17, with somewhat separated fuel intakes 35, 35 from the bin. From these intakes 35, 35, a couple of convergent chute sections 36, 36 (Fig. 3) lead downward to a common hopper-like delivery connection 37 to the lower cylindrical portion of the chute 23 (Figs. 1 and 2). The chute sections 36, 36 are enclosed by a metal casing 38 (Fig. 3) through which hot gases can be passed to heat and dry the falling fuel. For this purpose, conduits 40, 41 (Figs. 1 and 2) extend along the row of furnaces, crosswise of the fuel chutes, and are connected to the casing 38 at 42, 43. As shown in Figs. 1 and 2, the conduits 40, 41 are in a common horizontal trunk structure, one above the other. The upper conduit 40 is connected to the various furnace and boiler uptakes 14 by conduits 44, so as to supply waste furnace gases to dry the falling fuel, while the lower conduit 41 receives the spent gases and has discharge connections 46 at suitable intervals,—shown in Fig. 2 between the uptakes 14 at each side of the main stack 15. In the present instance, the connections 46 do not lead back into the main stack 15, but discharge through separate stacks 47. The draft created by the stacks 47 may be supplemented by means of motor-driven exhauster fans 48 connected between the connections 46 and the stacks 47.

Figure 3:
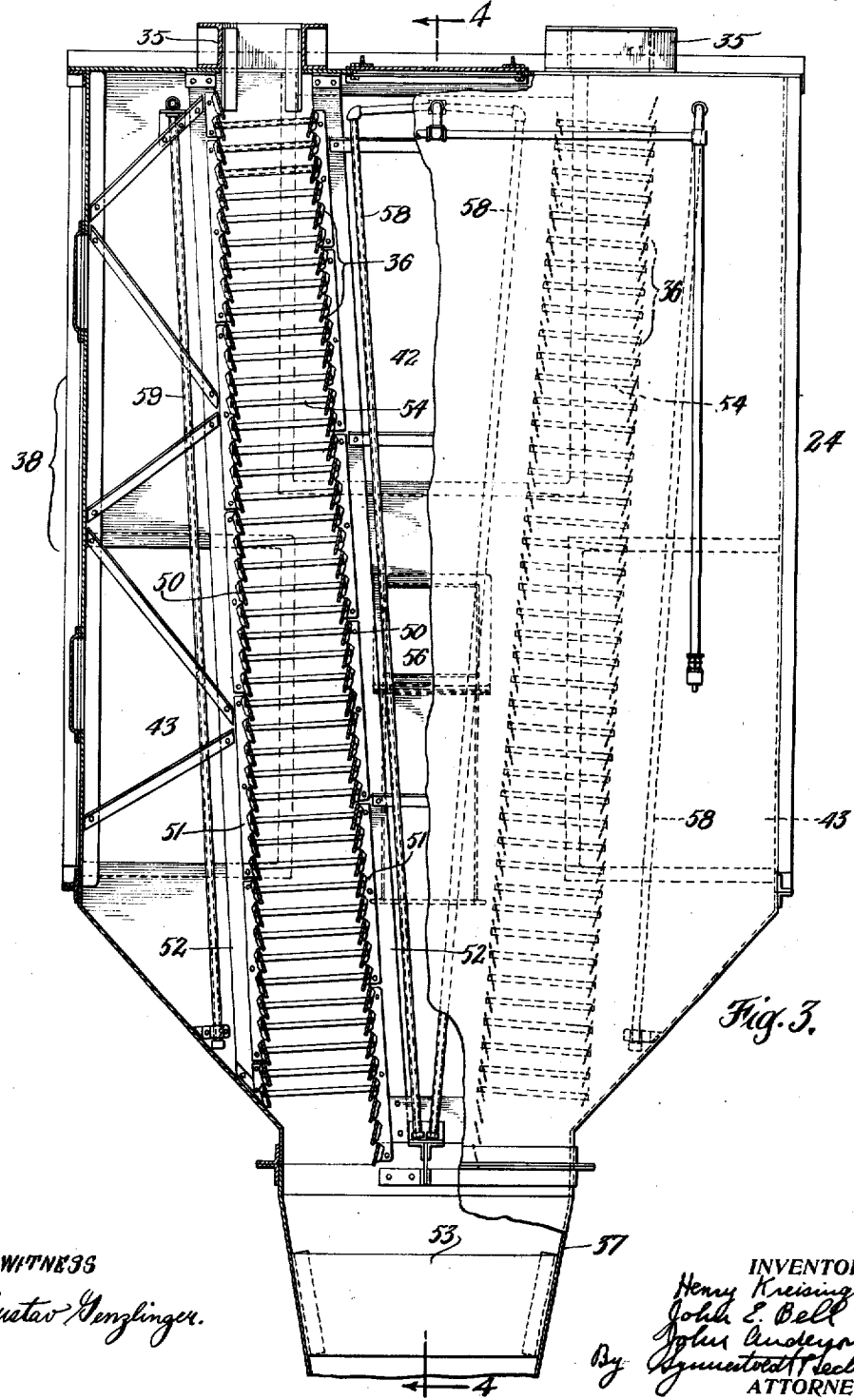
Fig. 3 shows a vertical mid-section through a drier, on a larger scale than Figs. 1 and 2.
Figure 4:
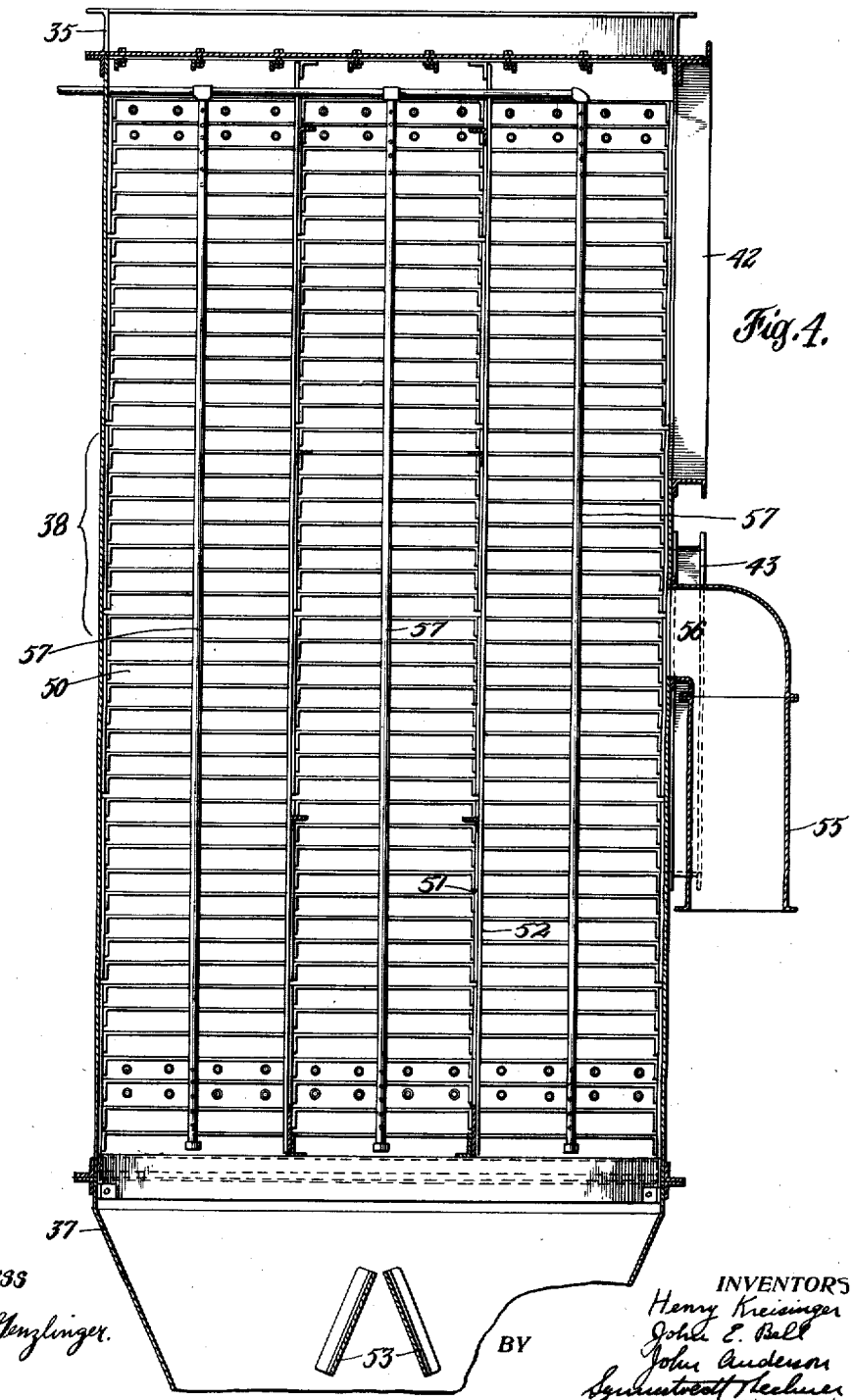
Fig. 4 shows a vertical mid-section through such a drier at right angles to Fig. 3, taken as indicated by the line 4—4 in Fig. 3.

As shown in Figs. 3 and 4, the chute sections 36, 36 within each casing 38 are pervious, and the supply and discharge connections 42, 43 to said casings are at opposite sides of the chute sections, so that the gases may pass across through each chute 36 and the falling fuel therein, in direct contact with the latter. In the present instance, the openings 42 from the conduit 40 introduce the hot gases into the upper region of the casing 38, between the chutes 36, while the openings 43 discharge the spent gases from the lower regions of said casings at either side, outside the chutes 36, 36. Each chute 36 is formed by opposed louvre walls 50 composed of slats with their ends secured to bars 51 themselves secured to the casing 38 and to uprights 52. The louvres 50 are suitably spaced apart to afford room between for a substantially unbroken fuel column, so that while free access and passage of gases is permitted, the falling fuel will always fall freely, without tendency to pack or to be held up. Preferably, the opposed walls 50 diverge downward somewhat, so that even if packing should occur, the packed fuel columns will still ultimately fall en masse,—and be broken up in the hopper 37. For this latter purpose, one or more bracing or stay plates 53 may be set sloping across the interior of the hopper 37. The angle of the slots is very important and that shown is such as to afford the necessary passage or circulation of the hot gases while at the same time the fuel cannot work laterally out.

In order to keep the falling fuel column more freely permeable to the gases, cross members 54 may be provided in each chute 36, to form voids or "eddies" amongst the falling particles of fuel. As shown, these cross members 54 consist of metal tubes with their ends mounted in holes in opposite sheet metal slats of the louvres 50. ½ inch standard iron pipe spaced about 6 inches on centers is suitable for this purpose. Opening through the louvre walls at their ends, the tubes 54 afford additional passages for gases through the fuel column, internally.

As shown in Figs. 1, 2, 3, and 4, the excess of air from the pulverizing system is discharged by a conduit 55 leading from the high point of the conduit 31 into the central region of the casing 38 at 56, below the hot gas inlet 42. This air being thus vented through the falling fuel and thence into the spent gas discharge, its content of fuel particles is strained out and recovered.

As shown in Fig. 1, butterfly dampers 57, 58 may be provided in the gas intake and discharge openings 42, 43 of the casing 38, as a means of regulating the passage of waste gases through the fuel columns. In this way, overheating and substantial distillation of the fuel can be prevented,—even though the gases be hot enough to produce such effects, as is likely to be the case with waste gases from a pulverized fuel furnace. As a precaution against the possibility of the fuel in the chutes 36 taking fire from the heat of the waste gases, a system of perforated pipes 59 (Figs. 3 and 4) may be mounted in the casing 38 at either side of each chute, so that steam can be blown in to displace the gases and smother any such fire.

Fig. 5 shows a reversal of gas intake and discharge openings 42, 43 for the drier 24. In this case, the hot waste gases enter the upper end of the casing 38 at either side, outside the chutes 36; and the spent gases are discharged from the lower end of said casing 38 at the center, from between the chutes 36.

What we claim is:

1. Fuel drying apparatus for a fuel supply system for a battery of pulverized fuel furnaces having a plurality of pulverizers delivering thereto, comprising in combination, fuel supply chutes for the pulverizers, a fuel drier in each chute, a conduit divided longitudinally into a plurality of passages, connections from the furnace flues to a passage of said conduit for delivering waste furnace gases to the latter, an opening from said passage to the drier in each chute, openings from the driers to another passage of said conduit, and means for exhausting the waste gases from said last-named passage.

2. A fuel supply system for a battery of pulverized fuel furnaces comprising elevated coarse fuel bins and pulverizers at a lower level for supplying the furnaces, with fuel chutes from bins to pulverizers; a conduit connected to the waste gas discharge means of the furnaces and to the chutes to supply waste gases to heat the falling fuel; and a conduit also connected to the chutes to carry off the spent gases.

3. A fuel supply system for a battery of pulverized fuel furnaces comprising elevated coarse fuel bins and pulverizers at a lower level for supplying the furnace; fuel chutes from bins to pulverizers having pervious sections, with casings enclosing them; and conduits for supplying and discharging waste gases from the furnaces extending crosswise of said chutes and connected to their casings to pass the gases through the falling fuel in said chutes.

4. A fuel drier for a pulverized fuel furnace comprising a casing, a pair of pervious fuel chutes therethrough, means for introducing furnace gases into and discharging spent gases from said casing, in the one case outside the chutes and in the other case between them, and for preventing overheating of the fuel by said gases.

5. A fuel drier for a pulverized fuel furnace comprising a casing, a pair of pervious fuel chutes therethrough converging from separate intakes at its upper end to a common delivery connection at its bottom, and means for introducing furnace gases into and discharging the spent gases from said casing at opposite ends, at one end outside the chutes and at the other end between them.

6. A fuel drier for a pulverized fuel furnace comprising a casing, a pair of pervious fuel chutes therethrough converging from separate intakes at its upper end to a common delivery connection at its bottom, means for introducing furnace gases into the upper region of said casing between the chutes, to pass outward to either side through the falling fuel in them, and means for discharging the spent gases from the lower regions of said casing outside the chutes.

7. A fuel drier for a pulverized fuel furnace comprising opposed louvre walls spaced apart to afford a fuel chute pervious for the passage of furnace gases through the falling fuel therein, with cross members carried by the louvres for keeping the fuel column freely permeable to the gases.

8. A fuel drier for a pulverized fuel furnace comprising opposed louvre walls spaced apart to afford a fuel chute pervious for the passage of furnace gases through the falling fuel therein, with cross tubes opening through the opposed louvres and affording additional passage for the gases through the fuel column.

In testimony whereof, we have hereunto signed our names.

HENRY KREISINGER.
JOHN E. BELL.
JOHN ANDERSON.

fuel drier in each chute, a conduit divided longitudinally into a plurality of passages, connections from the furnace flues to a passage of said conduit for delivering waste furnace gases to the latter, an opening from said passage to the drier in each chute, openings from the driers to another passage of said conduit, and means for exhausting the waste gases from said last-named passage.

2. A fuel supply system for a battery of pulverized fuel furnaces comprising elevated coarse fuel bins and pulverizers at a lower level for supplying the furnaces, with fuel chutes from bins to pulverizers; a conduit connected to the waste gas discharge means of the furnaces and to the chutes to supply waste gases to heat the falling fuel; and a conduit also connected to the chutes to carry off the spent gases.

3. A fuel supply system for a battery of pulverized fuel furnaces comprising elevated coarse fuel bins and pulverizers at a lower level for supplying the furnace; fuel chutes from bins to pulverizers having pervious sections, with casings enclosing them; and conduits for supplying and discharging waste gases from the furnaces extending crosswise of said chutes and connected to their casings to pass the gases through the falling fuel in said chutes.

4. A fuel drier for a pulverized fuel furnace comprising a casing, a pair of pervious fuel chutes therethrough, means for introducing furnace gases into and discharging spent gases from said casing, in the one case outside the chutes and in the other case between them, and for preventing overheating of the fuel by said gases.

5. A fuel drier for a pulverized fuel furnace comprising a casing, a pair of pervious fuel chutes therethrough converging from separate intakes at its upper end to a common delivery connection at its bottom, and means for introducing furnace gases into and discharging the spent gases from said casing at opposite ends, at one end outside the chutes and at the other end between them.

6. A fuel drier for a pulverized fuel furnace comprising a casing, a pair of pervious fuel chutes therethrough converging from separate intakes at its upper end to a common delivery connection at its bottom, means for introducing furnace gases into the upper region of said casing between the chutes, to pass outward to either side through the falling fuel in them, and means for discharging the spent gases from the lower regions of said casing outside the chutes.

7. A fuel drier for a pulverized fuel furnace comprising opposed louvre walls spaced apart to afford a fuel chute pervious for the passage of furnace gases through the falling fuel therein, with cross members carried by the louvres for keeping the fuel column freely permeable to the gases.

8. A fuel drier for a pulverized fuel furnace comprising opposed louvre walls spaced apart to afford a fuel chute pervious for the passage of furnace gases through the falling fuel therein, with cross tubes opening through the opposed louvres and affording additional passage for the gases through the fuel column.

In testimony whereof, we have hereunto signed our names.

HENRY KREISINGER.
JOHN E. BELL.
JOHN ANDERSON.

---

Certificate of Correction.

It is hereby certified that in Letters Patent No. 1,608,699, granted November 30, 1926, upon the application of Henry Kreisinger, of Piermont, John E. Bell, of Brooklyn, New York, and John Anderson, of Milwaukee, Wisconsin, for an improvement in " Fuel-Drying Apparatus," an error appears in the printed specification requiring correction as follows: Page 1, line 67, before the word " systems " insert the word certain; and that the said Letters Patent should be read with this correction therein that the same may conform to the record of the case in the Patent Office.

Signed and sealed this 28th day of December, A. D. 1926.

[SEAL.]
M. J. MOORE,
Acting Commissioner of Patents.

Certificate of Correction.

It is hereby certified that in Letters Patent No. 1,608,699, granted November 30, 1926, upon the application of Henry Kreisinger, of Piermont, John E. Bell, of Brooklyn, New York, and John Anderson, of Milwaukee, Wisconsin, for an improvement in " Fuel-Drying Apparatus," an error appears in the printed specification requiring correction as follows: Page 1, line 67, before the word " systems " insert the word *certain;* and that the said Letters Patent should be read with this correction therein that the same may conform to the record of the case in the Patent Office.

Signed and sealed this 28th day of December, A. D. 1926.

[SEAL.]
M. J. MOORE,
*Acting Commissioner of Patents.*